United States Patent
Lee et al.

(10) Patent No.: US 10,917,131 B2
(45) Date of Patent: *Feb. 9, 2021

(54) CASE, HAVING SOFT PROTECTIVE COVER AND HARD PROTECTIVE FRAME, FOR ELECTRONIC DEVICES

(71) Applicant: SPIGEN KOREA CO., LTD., Seoul (KR)

(72) Inventors: Bum Joon Lee, Seoul (KR); Seung Joo Kim, Seoul (KR); Nam Heui Jung, Seoul (KR); Kyung Joon Lee, Seoul (KR); Gang Il Park, Seoul (KR); Sun Woo Yun, Seoul (KR); Soo Ha Jung, Jung (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,363

(22) Filed: Feb. 26, 2020

(65) Prior Publication Data
US 2020/0195294 A1 Jun. 18, 2020

Related U.S. Application Data

(63) Continuation of application No. 15/917,485, filed on Mar. 9, 2018, now Pat. No. 10,594,353.
(Continued)

(51) Int. Cl.
*H04B 1/3888* (2015.01)
*H04M 1/02* (2006.01)
(Continued)

(52) U.S. Cl.
CPC .......... *H04B 1/3888* (2013.01); *A45C 11/00* (2013.01); *H04M 1/0202* (2013.01); *H04M 1/185* (2013.01); *A45C 2011/002* (2013.01)

(58) Field of Classification Search
CPC .................................................. H04L 31/3888
See application file for complete search history.

(56) References Cited

U.S. PATENT DOCUMENTS 8,245,842 B2 * 8/2012 Bau ................... B65D 85/00
206/305
D832,246 S * 10/2018 Kim ........................ D14/250
(Continued)

OTHER PUBLICATIONS

"Caseology Parallax Series iPhone 7 Plus / 8 Plus Cover Case with Design Slim Protective for Apple iPhone 7 Plus (2016) / iPhone 8 Plus (2017)—Matte Black", https://www.amazon.com/dp/B01LY50PST/ref=sspa_dk_detail_2?psc=1&pd_rd_i=B01LY50PST&pd_rd_wg=icXr2&pd_rd_r=GH162EAFZNP50Z3MFQ31&pd_rd_w=csf1K, Earliest review date of Sep. 9, 2016.
(Continued)

*Primary Examiner* — David Bilodeau
(74) *Attorney, Agent, or Firm* — Heedong Chae; Lucem, PC

(57) ABSTRACT

A case for an electronic device including a soft protective cover having a back panel to cover a back portion of the electronic device, side walls extending from the back panel to cover side portions of the electronic device, and an upper ledge; and a hard protective frame having a disconnected side and two facing sides. The disconnected side includes a first end portion and a second end portion. Each of the first and second end portions includes a first side and a second side; the second side tapers towards the upper ledge.

20 Claims, 22 Drawing Sheets

Related U.S. Application Data

(60) Provisional application No. 62/470,723, filed on Mar. 13, 2017, provisional application No. 62/469,418, filed on Mar. 9, 2017.

(51) Int. Cl.
*A45C 11/00* (2006.01)
*H04M 1/18* (2006.01)

(56) References Cited

U.S. PATENT DOCUMENTS

2010/0147737 A1* 6/2010 Richardson .......... B65D 81/022
 206/701
2015/0214991 A1* 7/2015 Ranchod ................ H04M 1/04
 455/575.8
2018/0262227 A1* 9/2018 Lee .................... H04M 1/0202

OTHER PUBLICATIONS

"iPhone 6S Plus Case, Caseology [Wavelength Series] Slim Fit Military-Grade Drop Protection [Navy Blue] for Apple iPhone 6S Plus (2015) & iPhone 6 Plus (2014)", https://www.amazon.com/iPhone-Caseology-Wavelength-Military-Grade-Protection/dp/B013W2C77G, Earliest review date of Sep. 10, 2015.

"Gold Apple iPhone 5 5S Hybrid Shockproof Hard Bumper Soft Case Cover Skin", https://www.nywatchstore.com/goapip55shys.html.

"ROCK PC+TPU Neo Hybrid Durable Slim Armor cover case for iphone X 6S 5S SE Plus", https://www.ebay.com/itm/ROCK-PC-TPU-Neo-Hybrid-Durable-Slim-Armor-cover-case-for-iphone-X-6S-5S-SE-Plus-/111952466831.

"ROCK Royce Hybrid Case for Apple iPhone 5 5S & SE Iron Grey", https://www.gadgetwear.co.uk/products/rock-royce-hybrid-case-for-apple-iphone-5-5s-se-iron-grey, Earliest review date of Aug. 26, 2016.

George Tinari, "Caseology review: Testing 4 of the nicest iPhone 6s cases available", published Nov. 28, 2015, accessed at http://www.cultofmac.com/399325/caseology-review/.

"iPhone SE Case, For Apple iPhone 5S/5 Case, ROCK [Royce] Anti-scratch Drop Protection Slim Fit Dual Layered Heavy Duty Armor Hybrid Hard PC + Soft TPU Protective Shell Case—Champagne Gold/Black", https://www.amazon.com/ROCKAntiscratchProtectionLayeredProtective/dp/B014A8AM7I, Earliest review date of Oct. 16, 2015.

Photos of "Gold Apple iPhone 5 5S Hybrid Shockproof Hard Bumper Soft Case Cover Skin", https://www.nywatchstore.com/goapip55shys.html.

* cited by examiner

-- Prior Art --

-- Prior Art --

29  92  42'

CASE, HAVING SOFT PROTECTIVE COVER AND HARD PROTECTIVE FRAME, FOR ELECTRONIC DEVICES

CROSS-REFERENCE TO RELATED APPLICATIONS

This application is a continuation of and claims priority to U.S. non-provisional patent application Ser. No. 15/917,485, filed on Mar. 9, 2018, which claims priority to U.S. provisional patent application No. 62/469,418, filed on Mar. 9, 2017, and U.S. provisional patent application No. 62/470,723, filed on Mar. 13, 2017, the disclosures of which are incorporated herein by reference in their entirety.

FIELD OF THE INVENTION

The present invention relates to a case, having a soft protective cover and a hard protective frame, for an electronic device and, more particularly, to a mobile phone case having a soft protective cover and a hard protective frame with a number of mating means for secure coupling between the soft protective cover and hard protective frame.

BACKGROUND OF THE INVENTION

Mobile electronic devices such as mobile phones, smart phones, tablet computers, MP3, PDA and the like are in wide use around the world. A user grips such device in his hand or hands to use it and uses his fingers to use various applications of the device. However, while using the device, the user may accidentally drop the device thereby causing damage to the device. In addition, use of mobile electronic devices may cause hand, limb and back problems due to the physical stress of holding the electronic device for an extended period of time.

Users of the mobile electronic devices use cases to protect their devices and manufacturers have produced different types of cases to help the users protect their mobile devices. One type of such cases is the one comprised of a soft protective cover and a hard protective frame in which the hard protective frame encircles the side portions of the soft protective cover as shown in FIGS. 1(a) and 1(b). Generally, the side portions of the soft protective cover have upper and lower ledges and the hard protective frame is received in between the two ledges and applies pressure to an electronic device installed in the soft protective cover. The hard protective frame is securely received in between the two ledges and is not easily dislodged.

However, the hard protective frame has holes for connector, speaker, earphone or other buttons, and the portions for such holes are manufactured thinners than other portions. Accordingly, such portions are more susceptible to damages or breakage. In addition, many cell phones necessitate a case to have several holes on its bottom side portion for charging cable, speaker, or earphone, and the bottom side portion of a case becomes especially more vulnerable to damage or breakage.

Therefore, to solve the problems, there is a need for a case of a soft protective cover and a hard protective frame to have structurally reinforcing elements. This invention is directed to solve these problems and satisfy the long-felt need.

SUMMARY OF THE INVENTION

The present invention contrives to solve the disadvantages of the prior art. The present invention provides a case, having a soft protective cover and a hard protective frame, for an electronic device and, more particularly, to a mobile phone case having a soft protective cover and a hard protective frame with a number of mating means for secure coupling between the soft protective cover and hard protective frame.

The object of the present invention is to provide a case for an electronic device, comprising: a soft protective cover having a back panel to cover a back portion of the electronic device and side walls extending from the back panel to cover side portions of the electronic device; a hard protective frame, constructed to removably mount on the soft protective cover and wrapping around the side walls of the soft protective cover, wherein the hard protective frame comprises a disconnected side and two facing sides, wherein the disconnected side is disconnected and has a first end portion and a second end portion; and a first mating means formed on the first and second end portions of the hard protective frame and corresponding portions of the side wall of the soft protective cover.

Another object of the present invention is to provide a case comprising a soft protective cover, a hard protective frame and a first mating means, and further comprising a rib connecting two facing sides of the hard protective frame.

The advantages of the present invention are: (1) the hard protective frame is securely and tightly coupled to the soft protective cover; (2) the case having the soft protective cover and hard protective frame provides effective protection to an electronic device installed therein; (3) the hard protective frame is not easily dislodged from the soft protective cover; (4) the soft protective cover and hard protective frame are very easy to assemble and dissemble; and (5) the coupling structure of the soft protective cover and the hard protective frame provides a stylish appearance.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1A:
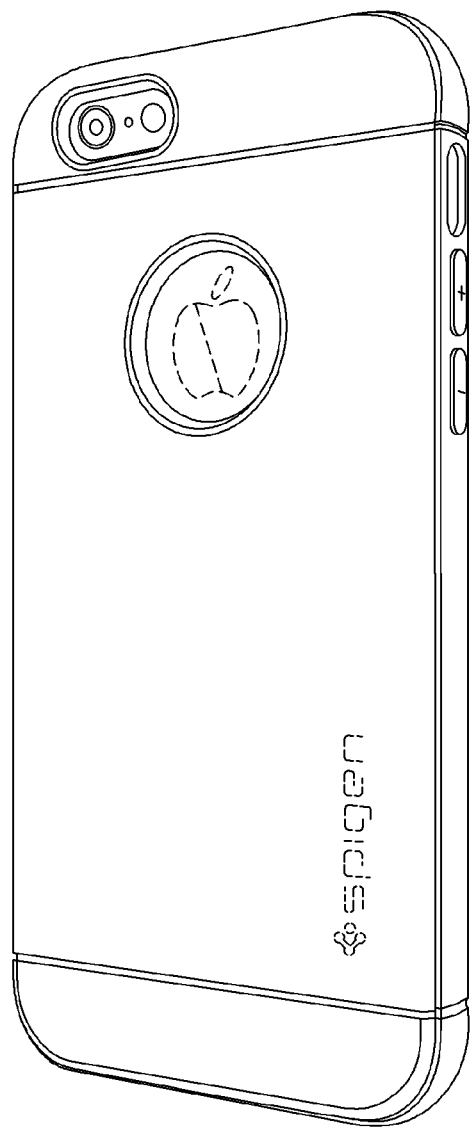
FIGS. 1(a) and 1(b) show prior art cases.
Figure 1B:
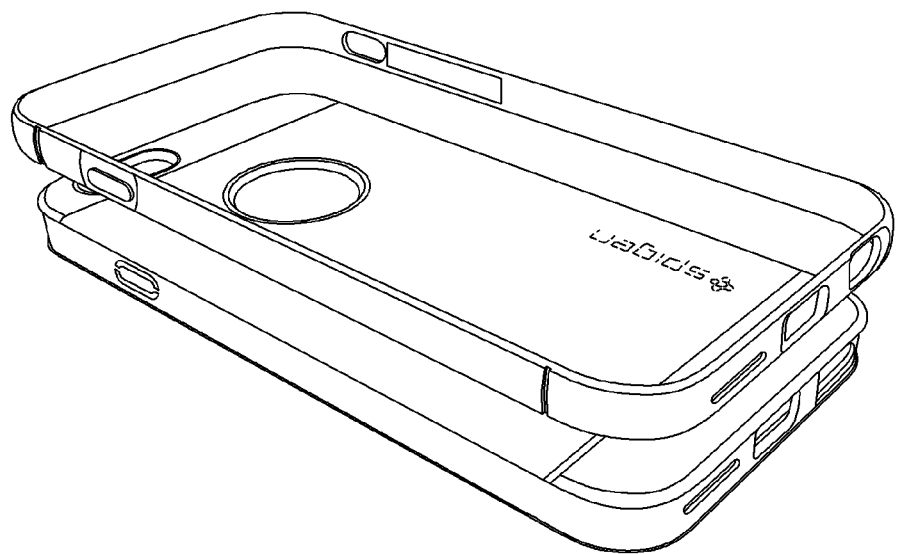

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

FIGS. 2-21 show the present invention. A case (10) for an electronic device (100) comprises a soft protective cover (20) including a back panel (21) to cover a back portion (110) of the electronic device (100) and side walls (22, 23, 24, 25) extending from the back panel (21) to cover side portions (120, 130, 140, 150) of the electronic device (100); a hard protective frame (30), constructed to removably mount on the soft protective cover (20) and wrapping around the side walls (22, 23, 24, 25) of the soft protective cover (20), wherein the hard protective frame (30) includes a disconnected side (35) and two facing sides (33, 34), wherein the disconnected side (35) is disconnected and has a first end portion (36) and a second end portion (37); and a first mating means (40) formed on the first and second end portions (36, 37) of the hard protective frame (30) and corresponding portions of the side wall (25) of the soft protective cover (20). In addition, the first and second end portions (36, 37) of the disconnected side (35) taper. The soft protective cover (20) further includes an upper ledge (27) outwardly extending from a top (26) of the side wall (25) of the soft protective cover (20), and the first and second end portions (36, 37) of the disconnected side (35) taper towards the upper ledge (27).

The first mating means (40) is to connect the hard protective frame (30) to the soft protective cover (20) and various types of coupling structures are possible.

Figure 11:
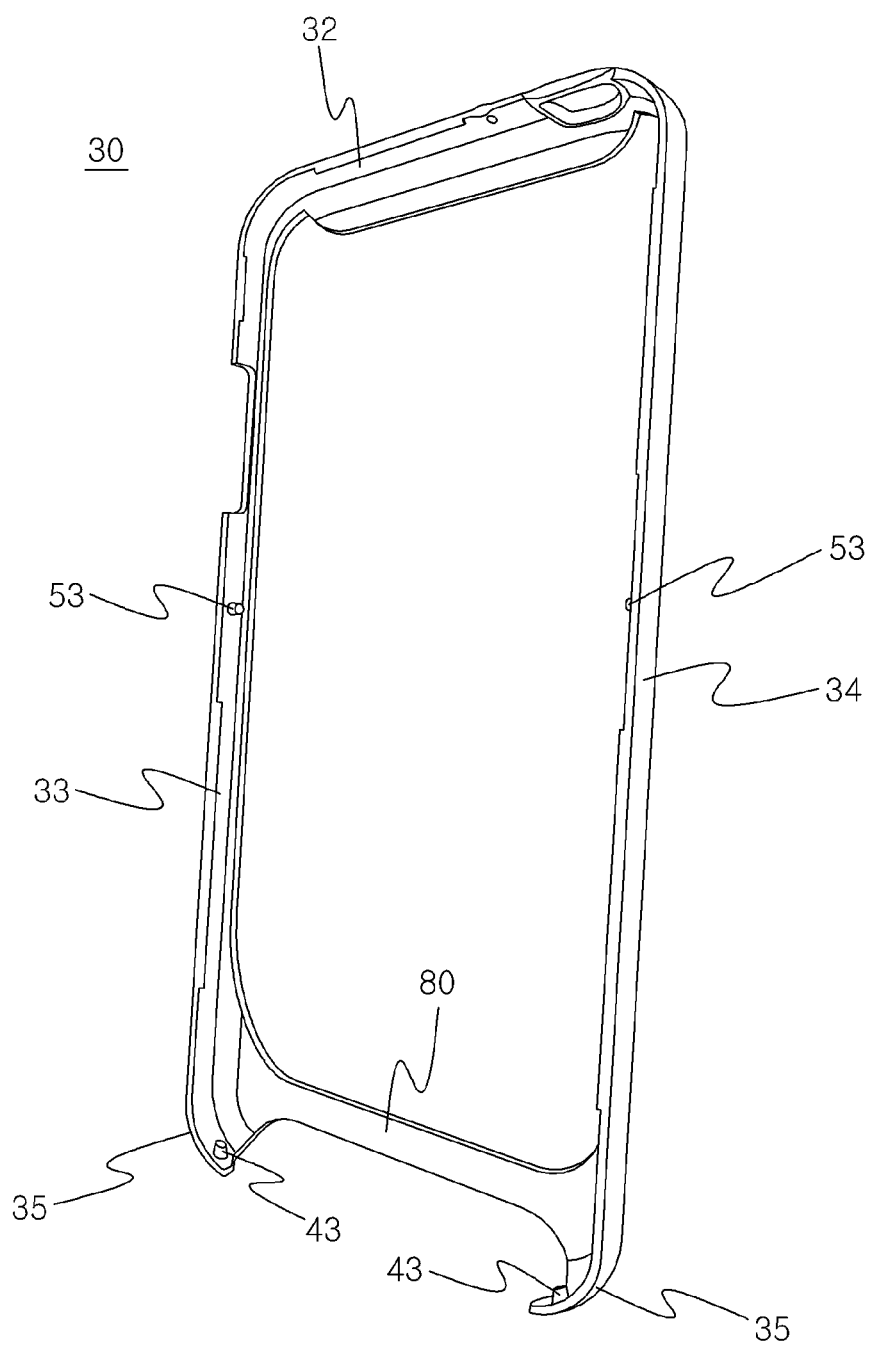
FIG. 11 shows a perspective view of the hard protective frame of the present invention.
Figure 12:
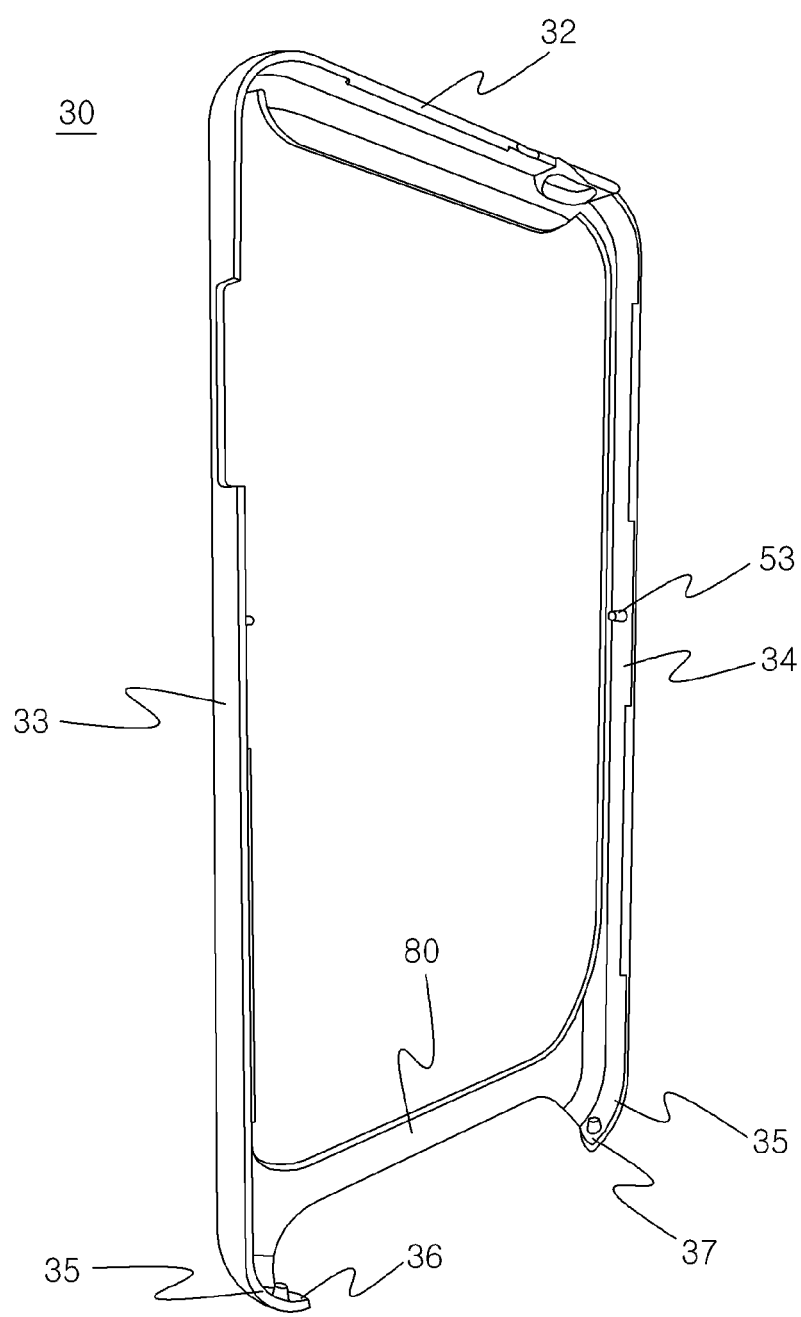
FIG. 12 shows another perspective view of the hard protective frame of the present invention.
Figure 15:
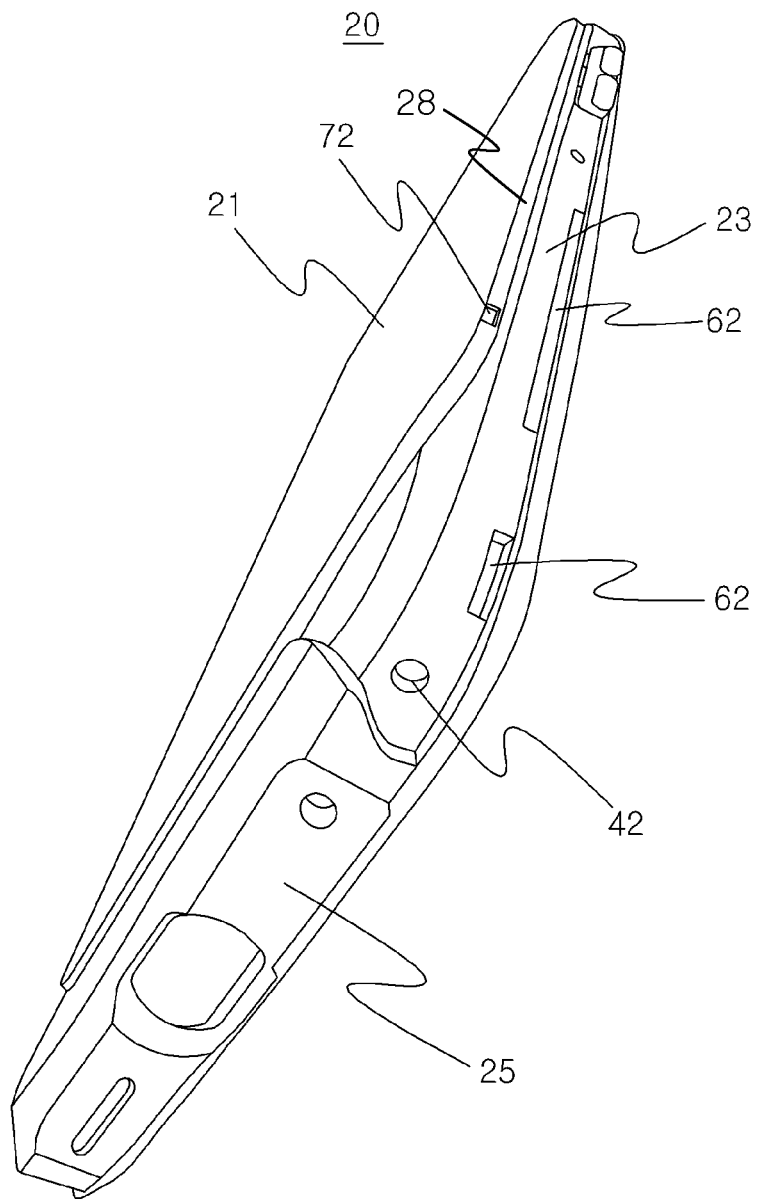
FIG. 15 shows a perspective view of the soft protective cover of the present invention.
Figure 16:
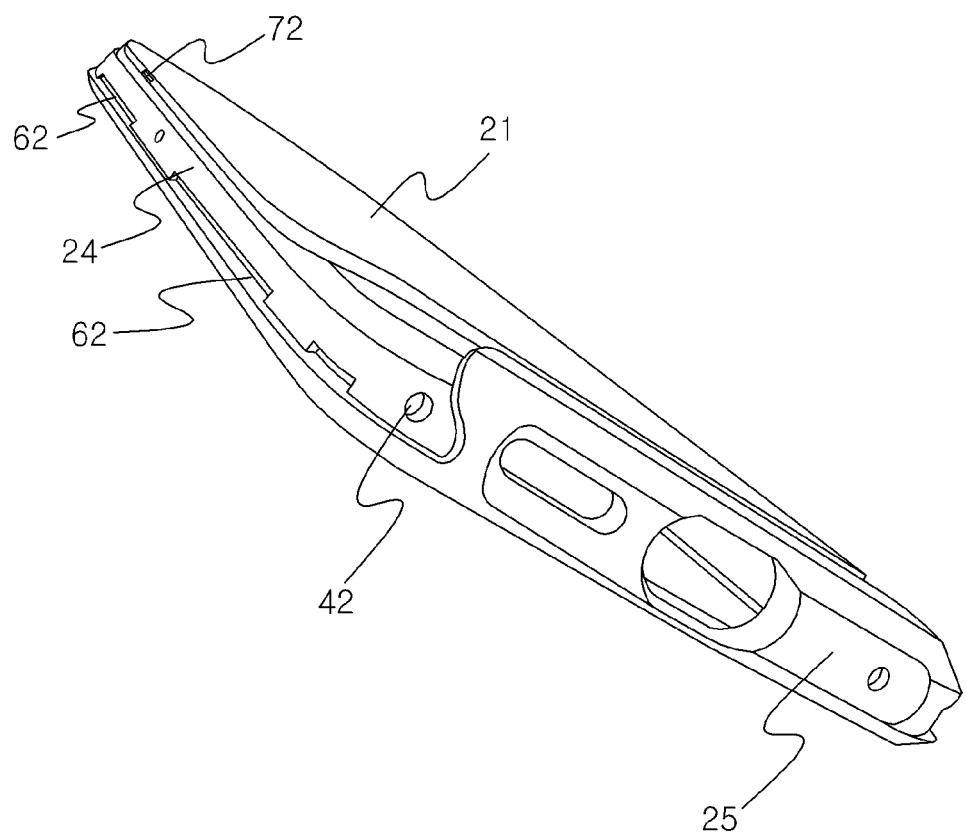
FIG. 16 shows another perspective view of the soft protective cover of the present invention.
Figure 17:
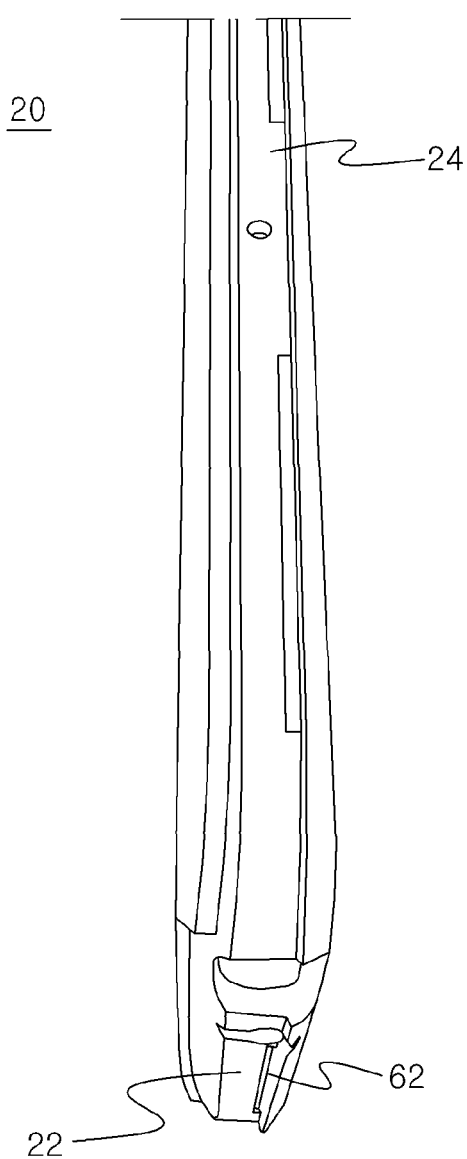
FIG. 17 shows still another perspective view of the soft protective cover of the present invention.
Figure 18:
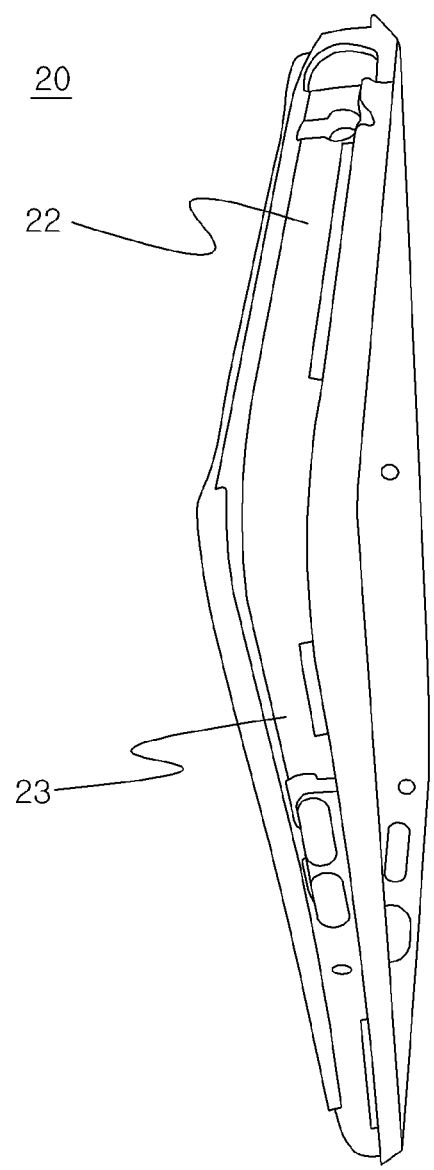
FIG. 18 shows still another perspective view of the soft protective cover of the present invention.

As shown in FIGS. 11, 15, 16 and other figures, the first mating means (40) may comprise first mating protrusions (43), formed on the first and second end portions (36, 37) of the hard protective frame (30), and first mating holes (42), formed on the side wall (25) of the soft protective cover (20), wherein the first mating protrusions (43) are mated with and received in the first mating holes (42).

Alternatively, first mating recess may be used instead of the first mating holes. In other words, the first mating means (40) comprises first mating protrusions (43), formed on the first and second end portions (36, 37) of the hard protective frame (30), and first mating recesses (42), formed on the side wall (25) of the soft protective cover (20), wherein the first mating protrusions (43) are mated with and received in the first mating recesses (42).

In another alternative embodiment, the first mating means (40) may comprise first mating protrusions (42'), formed on the side wall (25) of the soft protective cover (20), and first mating holes (43'), formed on the first and second end portions (36, 37) of the hard protective frame (30), wherein the first mating protrusions (42') are mated with and received in the first mating holes (43').

Figure 19:
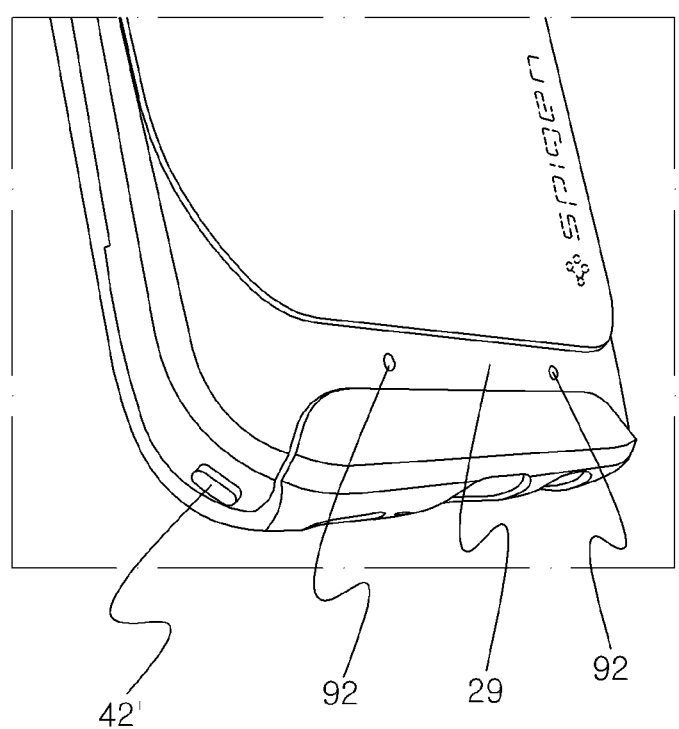
FIG. 19 shows the soft protective cover of the present invention.
Figure 20:
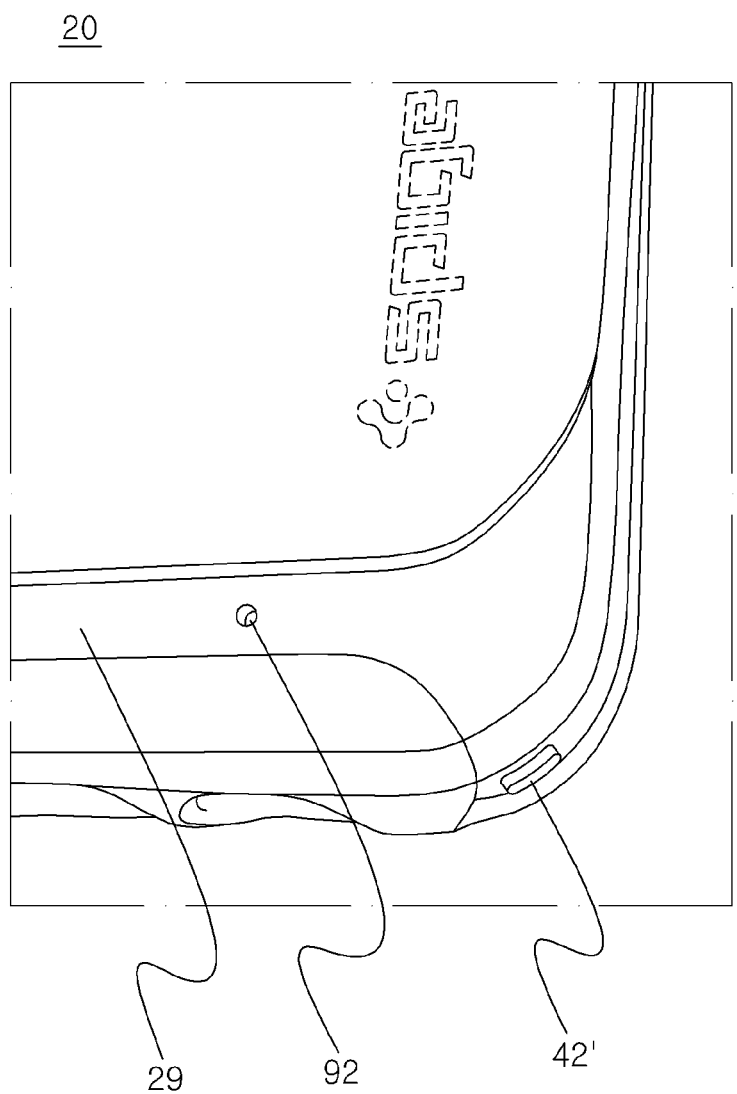
FIG. 20 shows the soft protective cover of the present invention.
Figure 21:
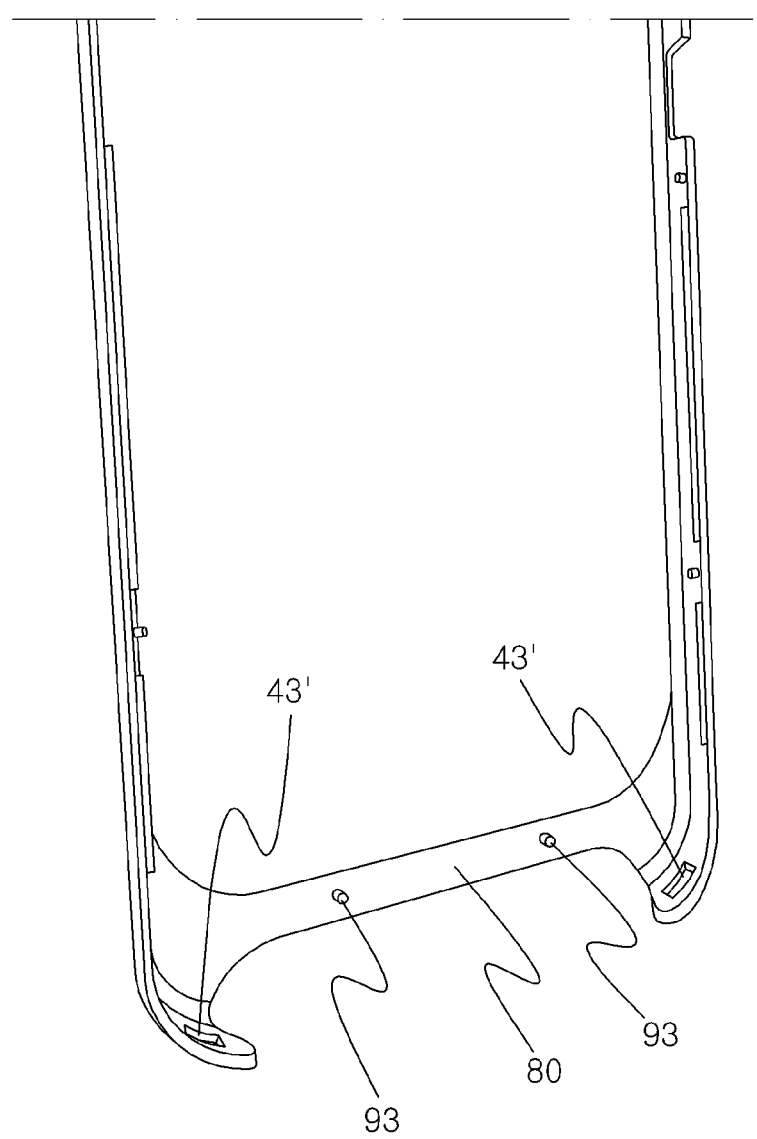
FIG. 21 shows the hard protective frame of the present invention.

In still another alternative embodiment as shown in FIGS. 19-21, the first mating means (40) may comprise first mating protrusions (42'), formed on the side wall (25) of the soft protective cover (20), and first mating recesses (43'), formed on the first and second end portions (36, 37) of the hard protective frame (30), wherein the first mating protrusions (42') are mated with and received in the first mating recesses (43').

Figure 2:
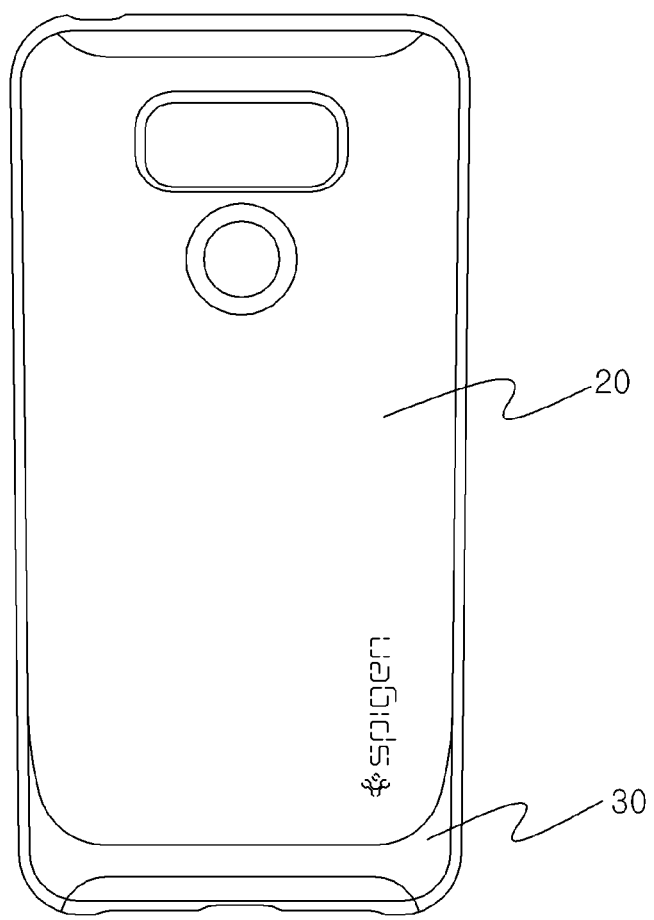
FIG. 2 shows a rear elevational view of the present invention.

As shown in FIG. 2, the hard protective frame (30) does not substantially cover the back portion (21) or the back portion (21) of the soft protective cover (20).

Figure 3:
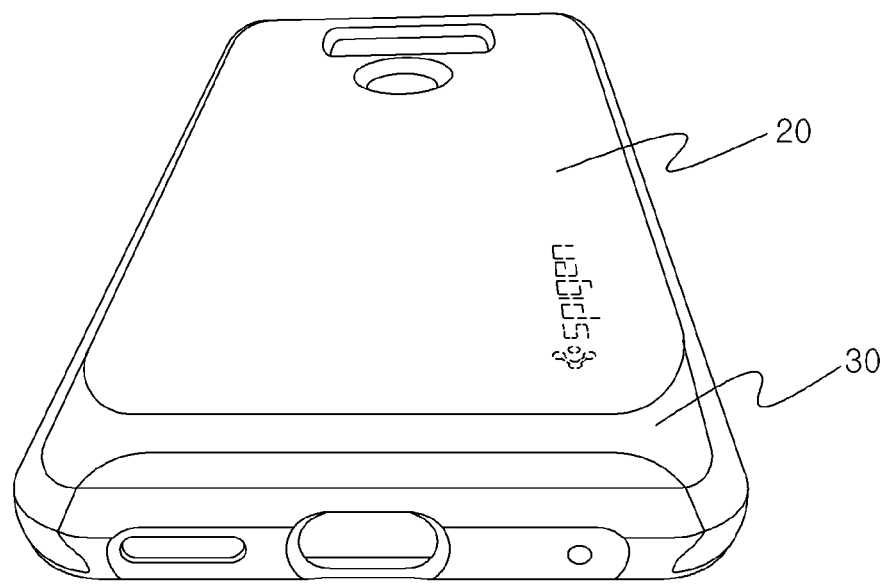
FIG. 3 shows a perspective view of the present invention.
Figure 4:
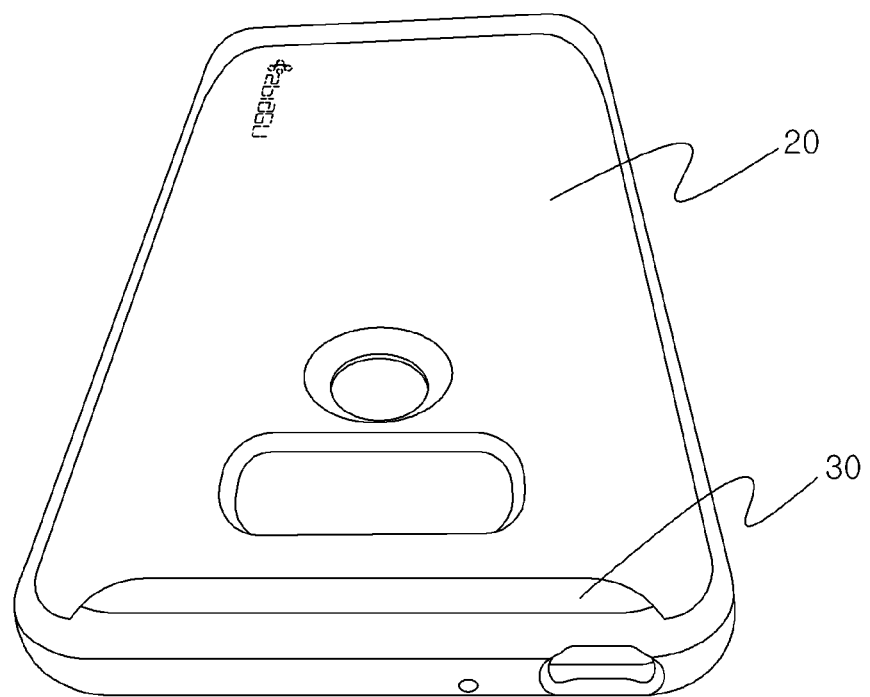
FIG. 4 shows another perspective view of the present invention.
Figure 5:
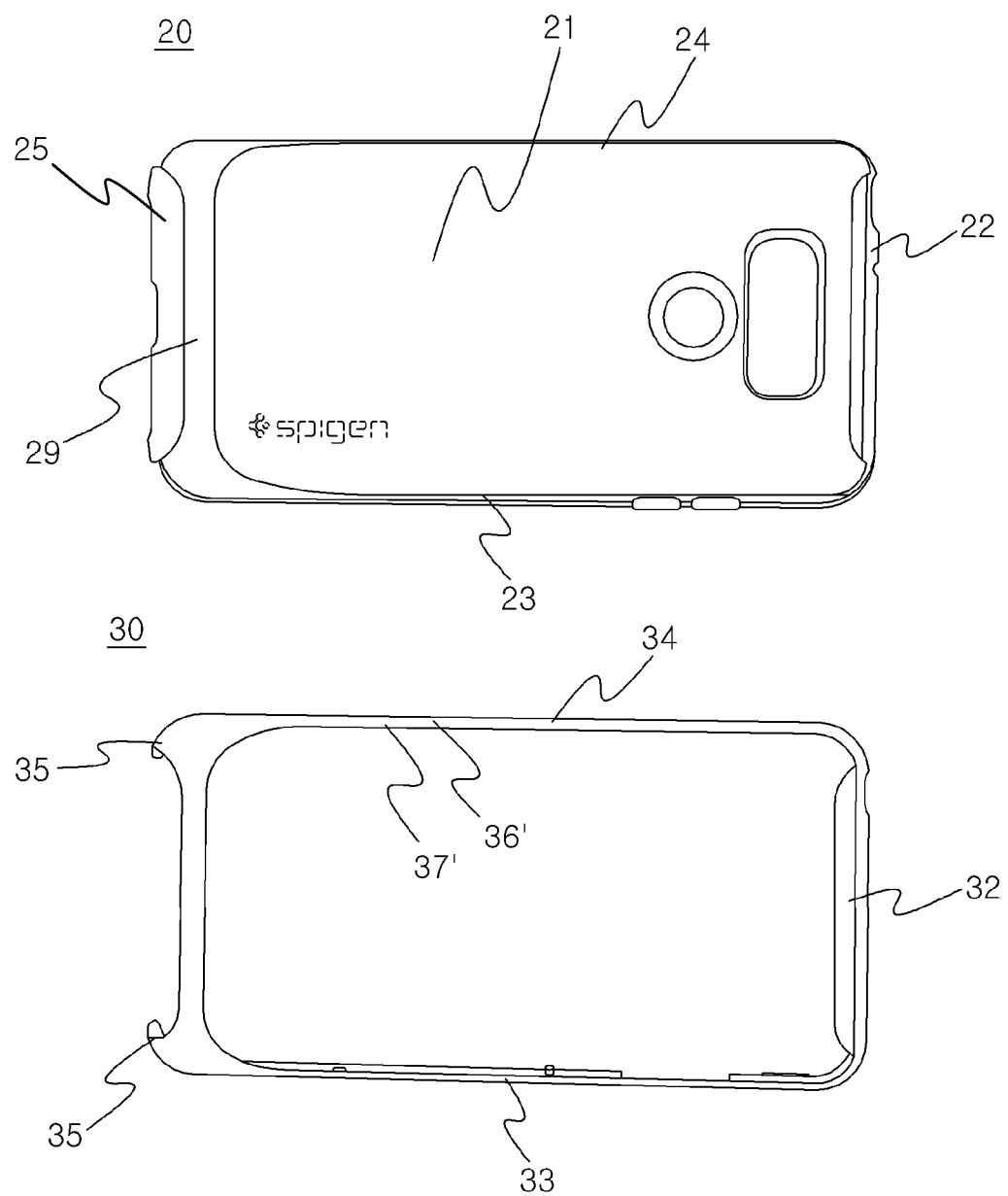
FIG. 5 shows a rear elevational view of the soft protective cover and the hard protective frame of the present invention.
Figure 6:
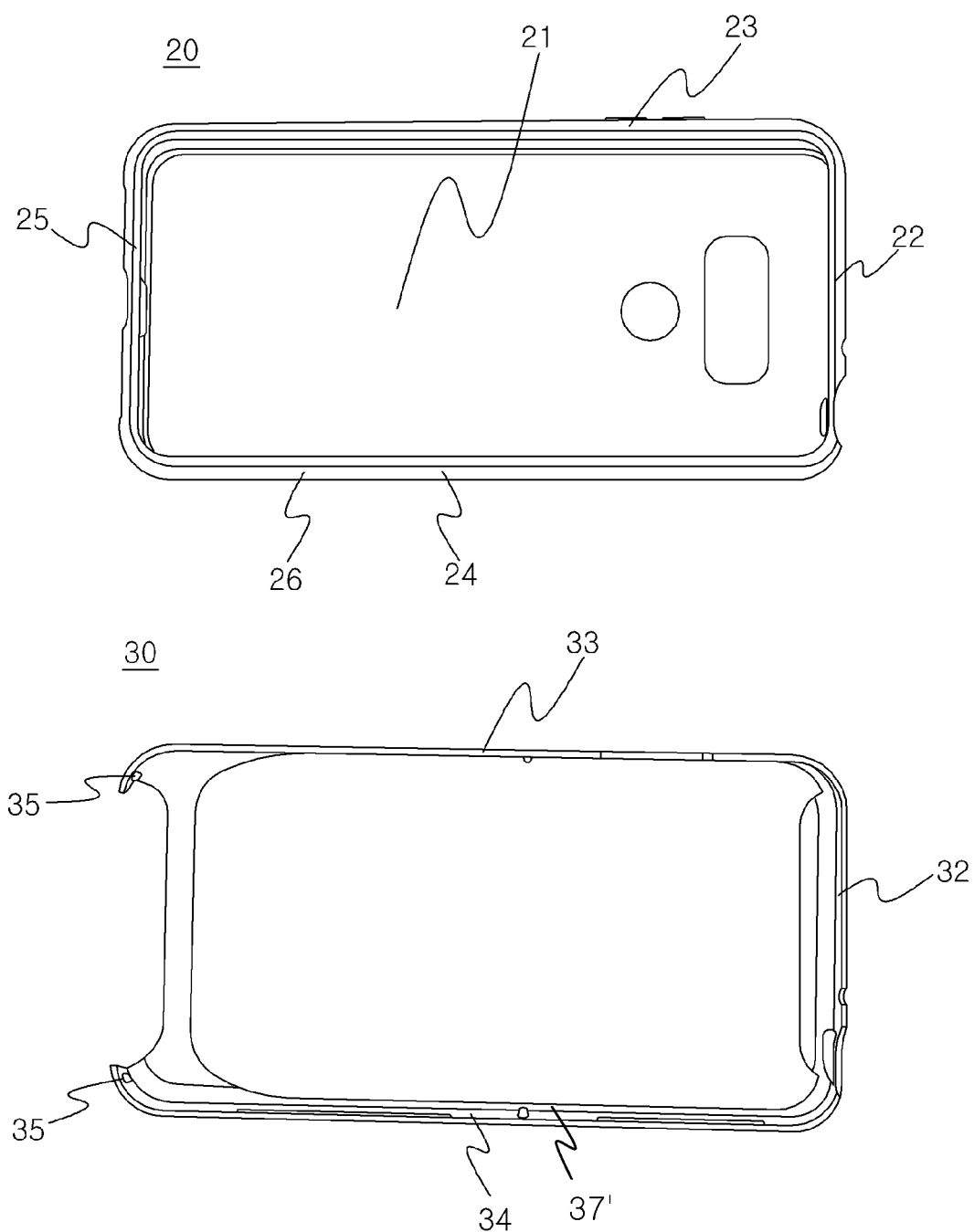
FIG. 6 shows a front elevational view of the soft protective cover and the hard protective frame of the present invention.
Figure 7:
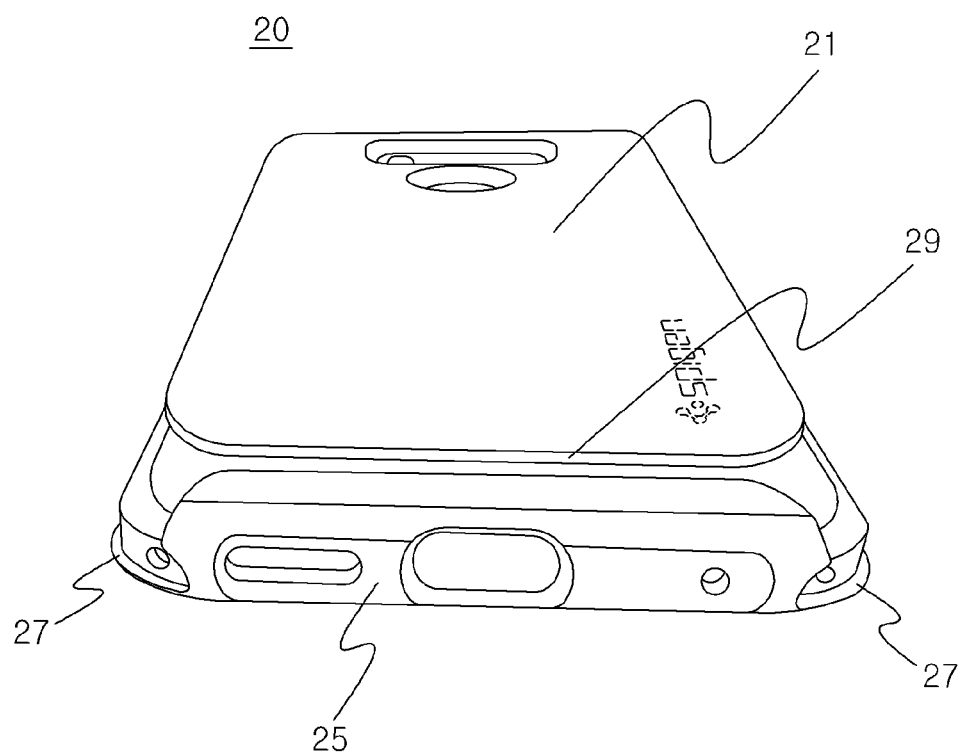
FIG. 7 shows a perspective view of the soft protective cover of the present invention.
Figure 8:
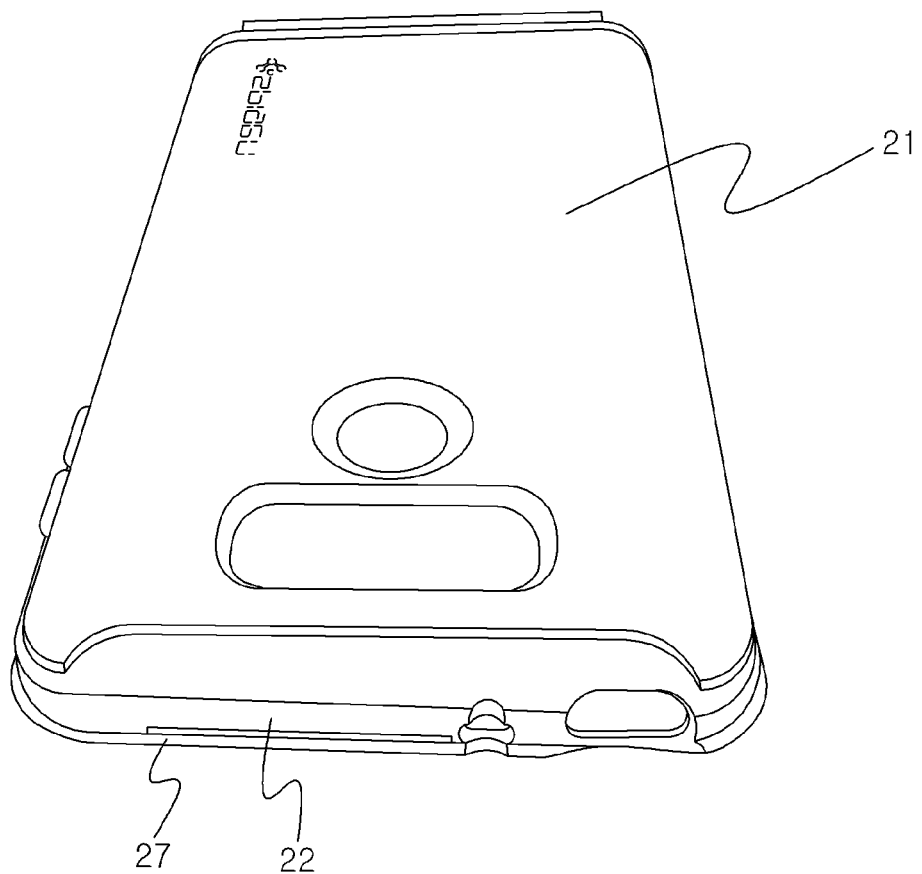
FIG. 8 shows another perspective view of the soft protective cover of the present invention.
Figure 13:
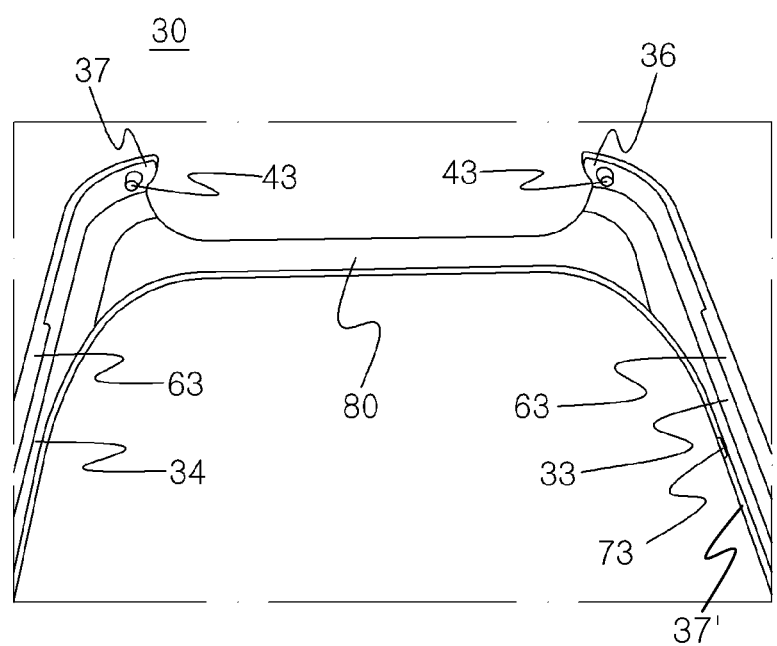
FIG. 13 shows still another perspective view of the hard protective frame of the present invention.

As shown in FIG. 3 or 13, the first and second end portions (36, 37) of the disconnected side (35) may taper. Preferably, the end portions (36, 37) taper towards the upper ledge (27) of the soft protective cover (20). In other words, one side of the end portions (36, 37) is straight along the ledge (27) whereas the other side tapers.

The side walls (22, 23, 24, 25) of the soft protective cover (20) comprises an upper ledge (27) outwardly extending from a top (26) of the side wall (25) of the soft protective cover (20), and the first and second end portions (36, 37) of the disconnected side (35) taper towards the upper ledge (27).

The case (10) may further comprise a second mating means (50) formed on the two facing sides (33, 34) of the hard protective frame (30) and corresponding portions of the side walls (23, 24) of the soft protective cover (20). The second mating means (50) provides additional coupling mechanism between the soft protective cover (20) and the hard protective frame (30) for secure and tight coupling between them.

Figure 9:
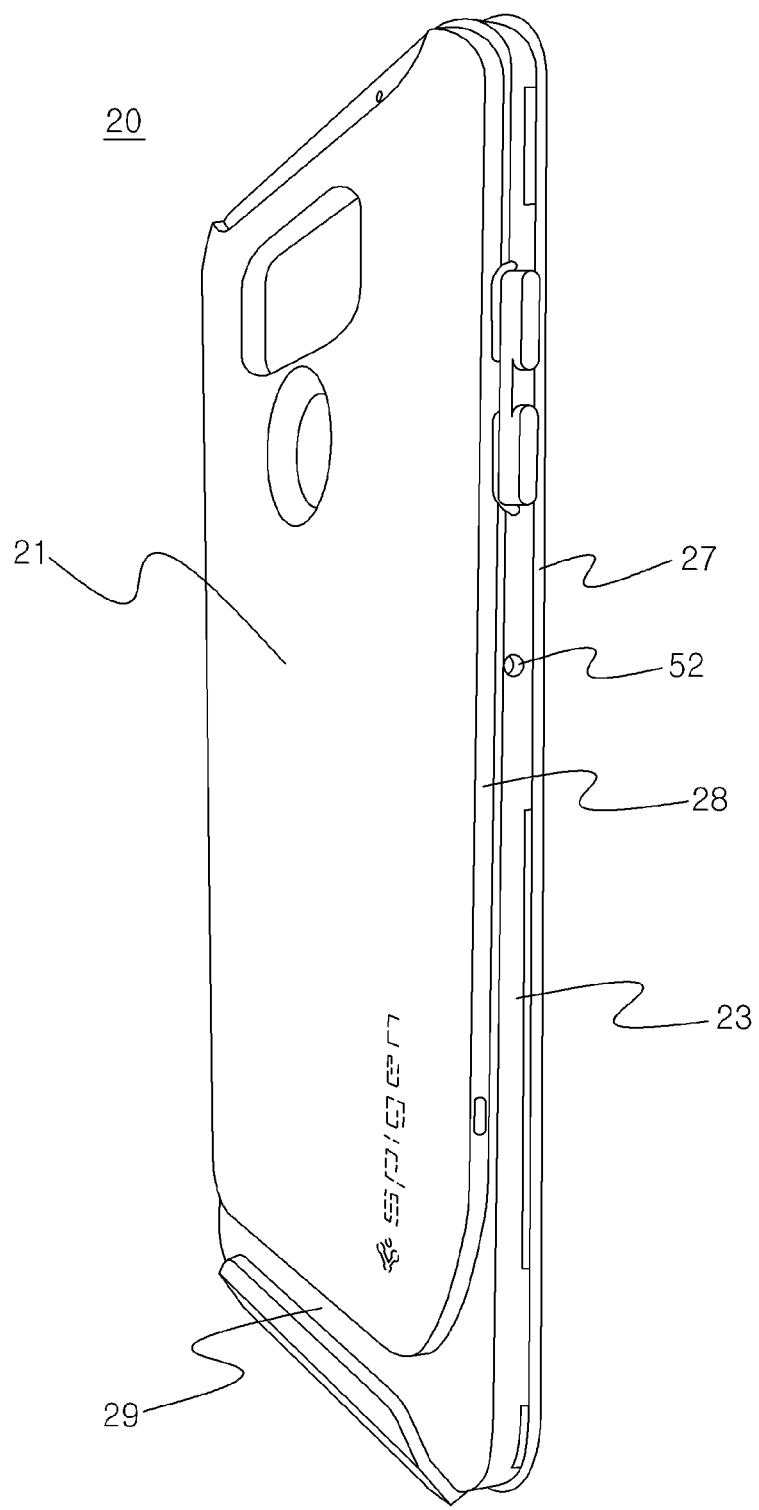
FIG. 9 shows still another perspective view of the soft protective cover of the present invention.
Figure 10:
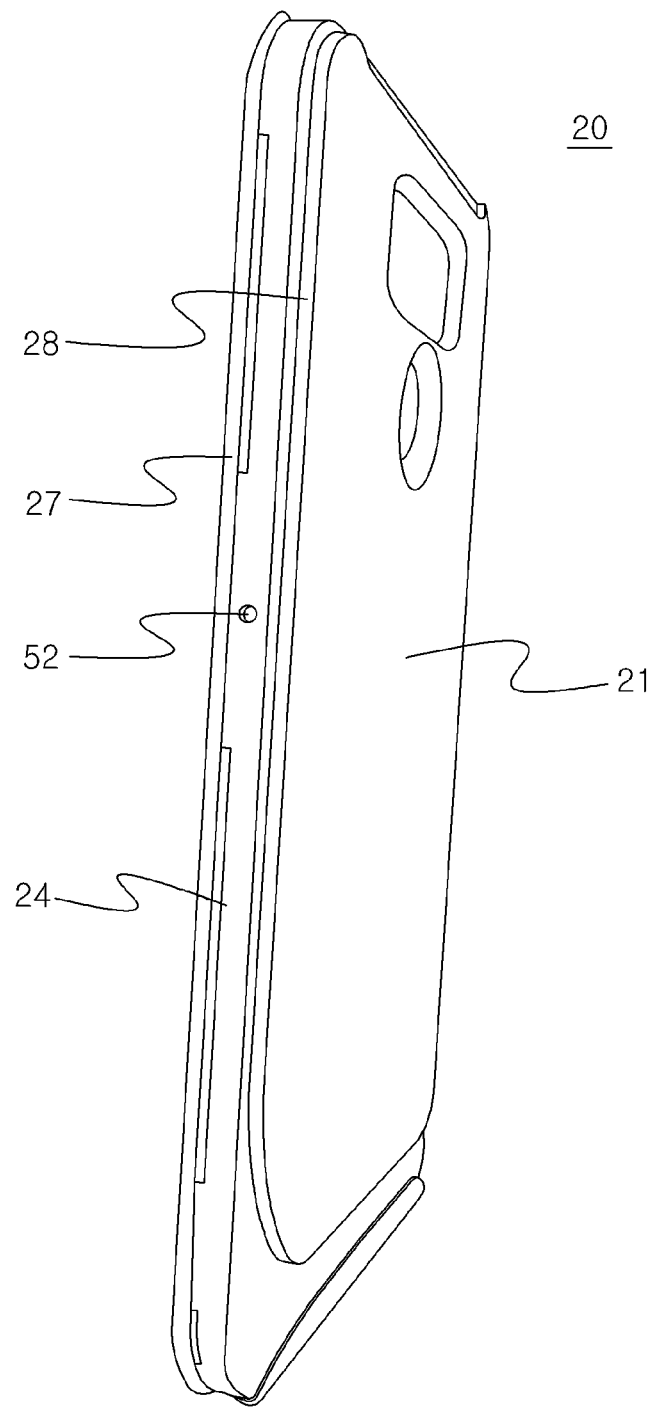
FIG. 10 shows still another perspective view of the soft protective cover of the present invention.
Figure 14:
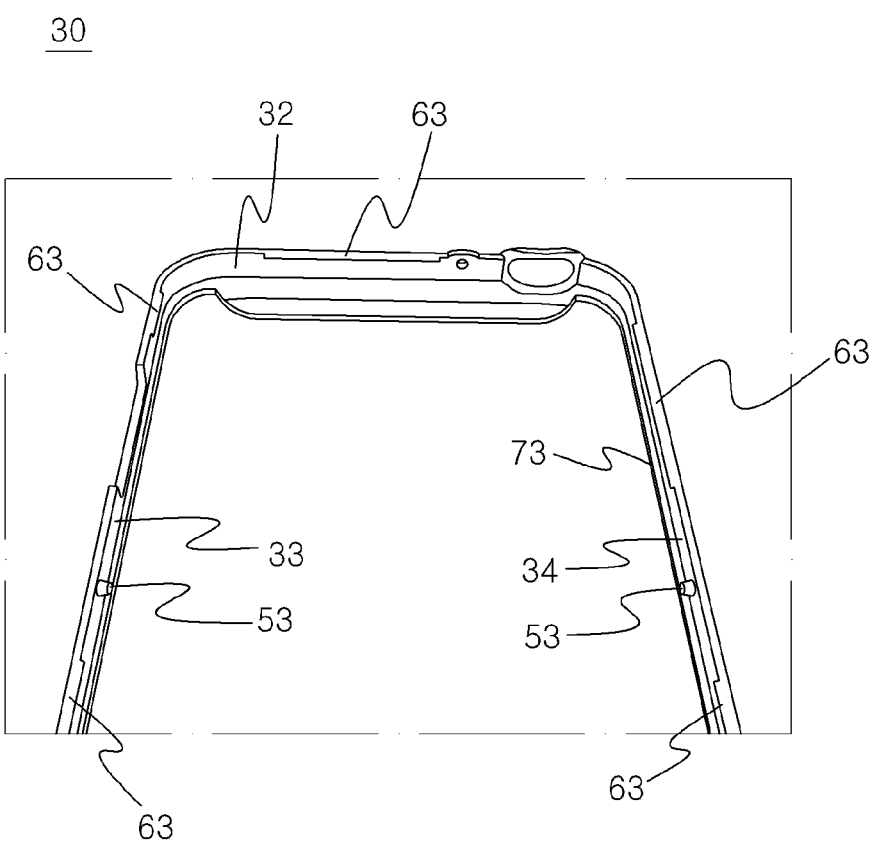
FIG. 14 shows still another perspective view of the hard protective frame of the present invention.

FIGS. 9, 10 and 14, the second mating means (50) may comprise second protrusions (53), formed on the two facing sides (33, 34) of the hard protective frame (30), and second mating holes (52), formed on the side walls (23, 24) of the soft protective cover (20), wherein the second mating protrusions (53) are mated with and received in the second mating holes (52).

Alternatively, the second mating means (50) may comprise second protrusions (53), formed on the two facing sides (33, 34) of the hard protective frame (30), and second mating recesses (52), formed on the side walls (23, 24) of the soft protective cover (20), wherein the second mating protrusions (53) are mated with and received in the second mating recesses (52).

In the alternative embodiment, the second mating protrusions may be formed on the soft protective cover (20) and the second mating holes or recesses may be formed on the hard protective frame (30).

The case (10) may further comprise a third mating means (60) formed on the hard protective frame (30) and corresponding portions of the side walls (22, 23, 24) of the soft protective cover (20), wherein the side walls (22, 23, 24, 25) of the soft protective cover (20) comprises an upper ledge (27) outwardly extending from a top (26) of the side walls (22, 23, 24, 25) of the soft protective cover (20).

As shown in FIGS. 13-17, the third mating means (60) may comprise third mating protrusions (63), longitudinally formed on the hard protective frame (30), and third mating recesses (62), longitudinally formed on the soft protective cover (20) immediately beneath the upper ledge (27) along the upper ledge (27), and wherein the third protrusions (63) are mated with and received in the third recesses (62).

In the alternative embodiment, the third mating protrusions may be formed on the soft protective cover (20) and the third mating holes or recesses may be formed on the hard protective frame (30).

The hard protective frame (30) may comprise a lower ledge (37') outwardly extending from a bottom (36') of the hard protective frame (30) and the soft protective cover (20) may comprise a longitudinal recess (28) to receive the lower ledge (37') of the hard protective frame (30). As shown in FIGS. 13-16, the case (10) may further comprise a fourth mating means (70) formed on the hard protective frame (30) and corresponding portions of the side walls (23, 24) of the soft protective cover (20).

The fourth mating means (70) may comprise fourth mating protrusions (73), formed on the lower ledge (37') of the hard protective frame (30), and fourth mating recesses (72), formed on the longitudinal recess (28) of the soft protective cover (20), and wherein the fourth protrusions (73) are mated with and received in the fourth recesses (72).

In the alternative embodiment, the fourth mating protrusions may be formed on the soft protective cover (20) and the fourth mating holes or recesses may be formed on the hard protective frame (30).

As shown in FIG. 11 and other figures, the hard protective frame (30) may further comprise a rib (80) connecting the two facing sides (33, 34) of the hard protective frame (30). Here, rib is a longitudinal member for structural reinforcement.

The soft protective cover (20) may further comprise a groove (29) formed on the back panel (21) of the soft protective cover (20) for receiving the rib (80), and the rib (80) may fit in the groove (29).

The rib (80) is formed much closer to the disconnected side (35) than the opposing side (32). More preferably, the rib (80) is formed right next to the disconnected side (35).

In the preferred embodiment, the rib (80) is wider toward the two facing sides (33, 34). In addition, both ends of the rib (80) respectively extend toward the first end portion (36) and the second end portion (37) and are connected to the first end portion (36) and the second end portion (37).

As shown in various figures, the soft protective cover (20) and the hard protective frame (30) are constructed into one piece. The soft protective cover (20) is made of soft material, and preferably, thermoplastic polyurethane (TPU). The hard protective frame (30) is made of hard material, and preferably, polycarbonate (PC).

Various mating means (40, 50, 60, 70) and the rib (80) and groove (29) provide very secure and tight connection between the soft protective cover (20) and the hard protective frame (30). The hard protective frame (30) does not have thin portion and is not susceptible to damage or breakage.

FIGS. 19-22 show the fifth mating means (90). The case (10) further comprises a fifth mating means (90) formed on the rib (80) of the hard protective frame (30) and corresponding portions of the soft protective cover (20). The fifth mating means (90) comprises fifth mating protrusions (93), formed on the rib (80) of the hard protective frame (30), and fifth mating holes (92), formed on the groove (29) of the soft protective cover (20), wherein the fifth mating protrusions (93) are mated with and received in the fifth mating holes (92). Here, fifth mating protrusions (93) include a protrusion (93) and the fifth mating holes (92) include a fifth mating hole (92). Preferably, there are two protrusions (93) and two holes (92).

Alternatively, the fifth mating means (90) may comprise fifth mating protrusions (93), formed on the rib (80) of the hard protective frame (30), and fifth mating recesses (92), formed on the groove (29) the soft protective cover (20), wherein the fifth mating protrusions (93) are mated with and received in the fifth mating recesses (92). Here, fifth mating protrusions (93) include a protrusion (93) and the fifth mating recesses (92) include a fifth mating recess (92). Preferably, there are two protrusions (93) and two recesses (92).

The case (10) further comprises a fifth mating means (90) formed on the rib (80) of the hard protective frame (30) and corresponding portions of the soft protective cover (20). The fifth mating means (90) comprises fifth mating protrusions (93), formed on the rib (80) of the hard protective frame (30), and fifth mating holes (92), formed on the soft protective cover (20), wherein the fifth mating protrusions (93) are mated with and received in the fifth mating holes (52). Here, fifth mating protrusions (93) include a protrusion (93) and the fifth mating holes (92) include a fifth mating hole (92). Preferably, there are two protrusions (93) and two holes (92).

Alternatively, the fifth mating means (90) may comprise fifth protrusions (93), formed on the rib (80) of the hard protective frame (30), and fifth mating recesses (92), formed on the soft protective cover (20), wherein the fifth mating protrusions (93) are mated with and received in the fifth mating recesses (92). Here, fifth mating protrusions (93) include a protrusion (93) and the fifth mating recesses (92) include a fifth mating recess (92). Preferably, there are two protrusions (93) and two recesses (92).

Various mating means (40, 50, 60, 70, 90) and the rib (80) and groove (29) provide very secure and tight connection between the soft protective cover (20) and the hard protective frame (30). The hard protective frame (30) does not have thin portion and is not susceptible to damage or breakage.

In the alternative embodiment, a case (10) for an electronic device (100) comprises a soft protective cover (20) having a back panel (21) to cover a back portion (110) of the electronic device (100) and side walls (22, 23, 24, 25) extending from the back panel (21) to cover side portions (120, 130, 140, 150) of the electronic device (100); and a hard protective frame (30), constructed to removably mount on the soft protective cover (20) and wrapping around the side walls (22, 23, 24, 25) of the soft protective cover (20). The hard protective frame (30) comprises a disconnected side (35) and two facing sides (33, 34), and the disconnected side (35) is disconnected and has a first end portion (36) and a second end portion (37). In addition, the hard protective frame (30) further comprises a rib (80) connecting the two facing sides (33, 34) of the hard protective frame (30), and the soft protective cover (20) further comprises a groove (29) formed on the back panel (21) of the soft protective cover (20) for receiving the rib (80). Preferably, the rib (80) is formed right next to the disconnected side (35).

In Preferred embodiment, the rib (80) is wider toward the two facing sides (33, 34). In addition, both ends of the rib (80) respectively extend toward the first end portion (36) and the second end portion (37) and are connected to the first end portion (36) and the second end portion (37).

The case (10) further comprises a first mating means (40) formed on the first and second end portions (36, 37) of the hard protective frame (30) and corresponding portions of the side wall (25) of the soft protective cover (20). Preferably, the first mating means (40) comprises first mating protrusions (43), formed on the first and second end portions (36, 37) of the hard protective frame (30), and first mating holes or recesses (42), formed on the side wall (25) of the soft protective cover (20). The first mating protrusions (43) are mated with and received in the first mating holes or recesses (42).

The first and second end portions (36, 37) of the disconnected side (35) taper, and the side walls (22, 23, 24, 25) of the soft protective cover (20) comprise an upper ledge (27) outwardly extending from a top (26) of the side wall (25) of the soft protective cover (20). The first and second end portions (36, 37) of the disconnected side (35) taper towards the upper ledge (27).

The case (10) further comprises a third mating means (60) formed on the hard protective frame (30) and corresponding portions of the side walls (22, 23, 24) of the soft protective cover (20). The side walls (22, 23, 24, 25) of the soft protective cover (20) comprise an upper ledge (27) outwardly extending from a top (26) of the side walls (22, 23, 24, 25) of the soft protective cover (20). Preferably, the third mating means (60) comprises third mating protrusions (63), longitudinally formed on the hard protective frame (30), and third mating recesses (62), longitudinally formed on the soft protective cover (20) immediately beneath the upper ledge (27) along the upper ledge (27). The third protrusions (63) are mated with and received in the third recesses (62).

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case (10) for an electronic device (100), comprising:
a soft protective cover (20), comprising a back panel (21) covering a back portion (110) of the electronic device (100) and side walls (22, 23, 24, 25) extending from the back panel (21) to cover side portions (120, 130, 140, 150) of the electronic device (100); and
a hard protective frame (30), comprising a disconnected side (35) and two facing sides (33, 34), wherein the disconnected side (35) and two facing sides (33, 34) are constructed to mount on the side walls (25, 23, 24) of the soft protective cover (20),
wherein the soft protective cover (20) further comprises an upper ledge (27) extending outwardly from a top (26) of the side wall (25) on which the disconnected side (35) mounts,
wherein the disconnected side (35) includes a first end portion (36) and a second end portion (37), and
wherein each of the first and second end portions (36, 37) includes:
a first side substantially adjacent to and extending along the upper ledge (27); and
a second side that tapers towards the upper ledge (27).

2. The case (10) of claim 1, wherein the hard protective frame further comprises an opposing side (32) which is opposite to the disconnected side (35),
wherein the opposing side (32), the disconnected side (35) and the two facing sides (33, 34) of the hard protective frame (30) wrap around the side walls (22, 23, 24, 25) of the soft protective cover (20),
wherein the hard protective frame (30) is constructed to removably mount on the soft protective cover (20),
wherein the hard protective frame (30) does not substantially cover a back portion (21) of the soft protective cover (20).

3. The case (10) of claim 2, wherein the hard protective frame (30) further comprises a rib (80) connecting the two facing sides (33, 34) of the hard protective frame (30).

4. The case (10) of claim 3, wherein the soft protective cover (20) further comprises a groove (29) formed on the back panel (21) of the soft protective cover (20) for receiving the rib (80).

5. The case (10) of claim 4, wherein the rib (80) is formed approximate to the disconnected side (35).

6. The case (10) of claim 5, wherein the rib (80) is wider toward the two facing sides (33, 34).

7. The case (10) of claim 6, wherein both ends of the rib (80) respectively extend toward the first end portion (36) and the second end portion (37) and respectively are connected to the first end portion (36) and the second end portion (37).

8. The case (10) of claim 7, further comprising:
a first mating means (40) formed on the first and second end portions (36, 37) of the hard protective frame (30) and corresponding portions of the side wall (25) of the soft protective cover (20),
wherein the first mating means (40) comprises first mating protrusions (42'), formed on the side wall (25) of the soft protective cover (20), and first mating holes or recesses (43'), formed on the first and second end portions (36, 37) of the hard protective frame (30),
wherein the first mating protrusions (42') are mated with and substantially received in the first mating holes or recesses (43').

9. The case (10) of claim 7, further comprising:
a first mating means (40) formed on the first and second end portions (36, 37) of the hard protective frame (30) and corresponding portions of the side wall (25) of the soft protective cover (20),
wherein the first mating means (40) comprises first mating protrusions (43), formed on the first and second end portions (36, 37) of the hard protective frame (30), and first mating holes or recesses (42), formed on the side wall (25) of the soft protective cover (20), wherein the first mating protrusions (43) are mated with and substantially received in the first mating holes or recesses (42).

10. The case (10) of claim 9, further comprising a fifth mating means (90) formed on the rib (80) of the hard protective frame (30) and corresponding portions of the soft protective cover (20),
wherein the fifth mating means (90) comprises fifth mating protrusions (93), formed on the rib (80) of the hard protective frame (30), and fifth mating holes or recesses (92), formed on the groove (29) of the soft protective cover (20), and wherein the fifth mating protrusions (93) are mated with and received in the fifth mating holes or recesses (92).

11. The case (10) of claim 7, further comprising a fifth mating means (90) formed on the rib (80) of the hard protective frame (30) and corresponding portions of the soft protective cover (20), wherein the fifth mating means (90) comprises fifth mating protrusions (93), formed on the rib (80) of the hard protective frame (30), and fifth mating holes or recesses (92), formed on the groove (29) of the soft protective cover (20), and wherein the fifth mating protrusions (93) are mated with and received in the fifth mating holes or recesses (92).

12. The case (10) of claim 7, further comprising a second mating means formed on the two facing sides (33, 34) of the hard protective frame (30) and corresponding portions of the side walls (23, 24) of the soft protective cover (20), wherein the second mating means comprises second protrusions (53), formed on the two facing sides (33, 34) of the hard protective frame (30), and second mating holes or recesses (52), formed on the side walls (23, 24) of the soft protective cover (20), wherein the second mating protrusions (53) are mated with and substantially received in the second mating holes or recesses (52).

13. The case (10) of claim 7, further comprising a third mating means (60) formed on the hard protective frame (30) and corresponding portions of the side walls (22, 23, 24) of the soft protective cover (20), wherein the side walls (22, 23, 24, 25) of the soft protective cover (20) comprise the upper ledge (27) which outwardly extends from a top (26) of the side walls (22, 23, 24, 25) of the soft protective cover (20), wherein the third mating means (60) comprises third mating protrusions (63), longitudinally formed on the hard protective frame (30), and third mating recesses (62), longitudinally formed on the soft protective cover (20) immediately beneath the upper ledge (27) along the upper ledge (27), and wherein the third protrusions (63) are mated with and substantially received in the third recesses (62).

14. The case (10) of claim 7, further comprising a fourth mating means (70) formed on the hard protective frame (30) and corresponding portions of the side walls (23, 24) of the soft protective cover (20), wherein the fourth mating means (70) comprises fourth mating protrusions (73), formed on the lower ledge (37') of the hard protective frame (30), and fourth mating recesses (72), formed on the longitudinal recess (28) of the soft protective cover (20), and wherein the fourth protrusions (73) are mated with and substantially received in the fourth recesses (72).

15. The case (10) of claim 7, wherein the hard protective frame (30) comprises a lower ledge (37') inwardly extending from a bottom (36') of the hard protective frame (30) and the soft protective cover (20) comprises a longitudinal recess (28) to substantially receive the lower ledge (37') of the hard protective frame (30).

16. The case (10) of claim 6, further comprising:

a first mating means (40) formed on the first and second end portions (36, 37) of the hard protective frame (30) and corresponding portions of the side wall (25) of the soft protective cover (20), wherein the first mating means (40) comprises first mating protrusions (43), formed on the first and second end portions (36, 37) of the hard protective frame (30), and first mating holes or recesses (42), formed on the side wall (25) of the soft protective cover (20), wherein the first mating protrusions (43) are mated with and substantially received in the first mating holes or recesses (42).

17. The case (10) of claim 16, further comprising a fifth mating means (90) formed on the rib (80) of the hard protective frame (30) and corresponding portions of the soft protective cover (20), wherein the fifth mating means (90) comprises fifth mating protrusions (93), formed on the rib (80) of the hard protective frame (30), and fifth mating holes or recesses (92), formed on the groove (29) of the soft protective cover (20), and wherein the fifth mating protrusions (93) are mated with and received in the fifth mating holes or recesses (92).

18. A case (10) for an electronic device (100), comprising:

a soft protective cover (20) comprising a back panel (21) covering a back portion (110) of the electronic device (100) and side walls (22, 23, 24, 25) extending from the back panel (21) to cover side portions (120, 130, 140, 150) of the electronic device (100); and a hard protective frame (30) constructed to mount on the soft protective cover (20), the hard protective frame (30) comprising:

a disconnected side (35) including a first end portion (36) and a second end portion (37);

two facing sides (33, 34); and a rib (80) connecting the two facing sides (33, 34) of the hard protective frame (30), wherein the rib (80) is formed right next to the disconnected side (35), and wherein the rib (80) is wider towards the two facing sides (33, 34) such that the rib includes a first rib end that extends from the first end portion (36) of the disconnected side (35) and a second rib end that extends from the second end portion (37) of the disconnected side (35).

19. The case (10) of claim 18, wherein the hard protective frame further comprises an opposing side (32) which is opposite to the disconnected side (35), wherein the opposing side (32), the disconnected side (35) and the two facing sides (33, 34) of the hard protective frame (30) wrap around the side walls (22, 23, 24, 25) of the soft protective cover (20), wherein the hard protective frame (30) is constructed to removably mount on the soft protective cover (20), wherein the hard protective frame (30) does not substantially cover a back portion (21) of the soft protective cover (20), and wherein the soft protective cover (20) further comprises a groove (29) formed on the back panel (21) of the soft protective cover (20) for receiving the rib (80).

20. The case (10) of claim 19, further comprising a first mating means (40) formed on the first and second end portions (36, 37) of the hard protective frame (30) and corresponding portions of the side wall (25) of the soft protective cover (20), wherein the first mating means (40) comprises first mating protrusions (43), formed on the first and second end portions (36, 37) of the hard protective frame (30), and first mating holes or recesses (42), formed on the side wall (25) of the soft protective cover (20), wherein the first mating protrusions (43) are mated with and substantially received in the first mating holes or recesses (42), wherein the case (10) further comprises a fifth mating means (90) formed on the rib (80) of the hard protective frame (30) and corresponding portions of the soft protective cover (20), wherein the fifth mating means (90) comprises fifth mating protrusions (93), formed on the rib (80) of the hard protective frame (30), and fifth mating holes or recesses (92), formed on the groove (29) of the soft protective cover (20), and wherein the fifth mating protrusions (93) are mated with and received in the fifth mating holes or recesses (92).

* * * * *